United States Patent
Radford et al.

(10) Patent No.: US 12,126,297 B2
(45) Date of Patent: Oct. 22, 2024

(54) METHODS OF MAGNETIZING AND CONTROLLING A VARIABLE-FLUX MEMORY MOTOR

(71) Applicant: Jacobi Motors LLC, Webster, TX (US)

(72) Inventors: Nicolaus Radford, Webster, TX (US); Mohammadreza Barzegaranbaboli, Webster, TX (US)

(73) Assignee: Jacobi Motors LLC, Webster, TX (US)

( * ) Notice: Subject to any disclaimer, the term of this patent is extended or adjusted under 35 U.S.C. 154(b) by 258 days.

(21) Appl. No.: 17/771,675

(22) PCT Filed: Oct. 23, 2020

(86) PCT No.: PCT/US2020/057140
§ 371 (c)(1),
(2) Date: Apr. 25, 2022

(87) PCT Pub. No.: WO2021/081383
PCT Pub. Date: Apr. 29, 2021

(65) Prior Publication Data
US 2022/0376638 A1    Nov. 24, 2022

Related U.S. Application Data

(60) Provisional application No. 62/926,126, filed on Oct. 25, 2019.

(51) Int. Cl.
*H02P 6/10* (2006.01)
*H02K 1/278* (2022.01)
(Continued)

(52) U.S. Cl.
CPC ............. *H02P 6/10* (2013.01); *H02K 1/278* (2013.01); *H02P 6/17* (2016.02); *H02K 1/02* (2013.01); *H02P 2207/055* (2013.01)

(58) Field of Classification Search
CPC ........ H02P 6/10; H02P 6/17; H02P 2207/055; H02K 11/02
See application file for complete search history.

(56) References Cited

U.S. PATENT DOCUMENTS

| | | |
|---|---|---|
| 3,412,257 A | 11/1968 | Miller et al. |
| 6,373,162 B1 | 4/2002 | Liang et al. |

(Continued)

FOREIGN PATENT DOCUMENTS

| | | |
|---|---|---|
| CN | 101232205 A | 7/2008 |
| DE | 102006006824 A1 | 8/2007 |

(Continued)

OTHER PUBLICATIONS

International Search Report issued in PCT/US2020/057140 on Feb. 11, 2021 (4 pages).

(Continued)

*Primary Examiner* — Rina I Duda
(74) *Attorney, Agent, or Firm* — David L. Cohen

(57) ABSTRACT

A method for magnetizing a soft magnet in a rotor of a variable-flux memory motor (VFMM) includes: generating a first pulse of electric current that has a duration of equal to or more than 0.1 millisecond (ms) and equal to or less than 2 ms; and applying the first pulse to a stator winding of the VFMM to set a magnetization state of the soft magnet to a first magnetization state.

16 Claims, 17 Drawing Sheets

(51) Int. Cl.
*H02P 6/17* (2016.01)
*H02K 1/02* (2006.01)

(56) References Cited

U.S. PATENT DOCUMENTS

| | | | |
|---|---|---|---|
| 6,591,925 | B2 | 7/2003 | Raftari et al. |
| 6,800,977 | B1 | 10/2004 | Ostovic |
| 7,598,645 | B2 | 10/2009 | Ley et al. |
| 8,330,404 | B2* | 12/2012 | Sakai ............... H02P 21/22 318/400.3 |
| 8,860,356 | B2 | 10/2014 | Yuuki et al. |
| 8,884,576 | B2* | 11/2014 | Yuuki ............... H02P 21/06 318/432 |
| 9,306,423 | B2 | 4/2016 | Jang et al. |
| 10,063,180 | B2 | 8/2018 | Wang et al. |
| 10,848,014 | B2 | 11/2020 | Radford et al. |
| 11,936,256 | B2 | 3/2024 | Radford et al. |
| 2006/0170301 | A1 | 8/2006 | Masuzawa et al. |
| 2008/0292691 | A1 | 11/2008 | LLoyd |
| 2009/0261774 | A1 | 10/2009 | Yuuki et al. |
| 2010/0327787 | A1 | 12/2010 | Sakai et al. |
| 2012/0217834 | A1 | 8/2012 | Lutz et al. |
| 2013/0334991 | A1* | 12/2013 | Yuuki ............... H02P 23/28 318/718 |
| 2015/0069876 | A1 | 3/2015 | Jang et al. |
| 2016/0344242 | A1 | 11/2016 | Jang et al. |
| 2017/0279392 | A1 | 9/2017 | Fukushige et al. |
| 2019/0173336 | A1 | 6/2019 | Takeuchi et al. |
| 2019/0207492 | A1 | 7/2019 | Lin et al. |
| 2019/0296594 | A1 | 9/2019 | Nashiki |
| 2020/0014289 | A1 | 1/2020 | Ko et al. |
| 2020/0328632 | A1 | 10/2020 | Radford et al. |
| 2021/0265880 | A1 | 8/2021 | Shinji et al. |
| 2021/0336519 | A1 | 10/2021 | Radford et al. |
| 2022/0006358 | A1 | 1/2022 | Takahashi et al. |
| 2022/0407374 | A1 | 12/2022 | Radford et al. |
| 2023/0361635 | A1 | 11/2023 | Senti et al. |

FOREIGN PATENT DOCUMENTS

| | | | |
|---|---|---|---|
| EP | 3032718 | A1 | 6/2016 |
| EP | 3561999 | A1 | 10/2019 |
| GB | 2284104 | A | 2/2011 |
| JP | H02223342 | A | 9/1990 |
| JP | H04238005 | A | 8/1992 |
| JP | H11168867 | A | 6/1999 |
| JP | 2009017694 | A | 1/2009 |
| JP | 4337989 | B1 | 9/2009 |
| JP | 2010-220400 | A | 9/2010 |
| JP | 2013-106480 | A | 5/2013 |
| JP | 2013106388 | A | 5/2013 |
| JP | 2014168331 | A | 9/2014 |
| JP | 2017200437 | A | 11/2017 |
| WO | 2008062543 | A1 | 5/2008 |
| WO | 2014003730 | A1 | 1/2014 |

OTHER PUBLICATIONS

Written Opinion of the International Searching Authority issued in PCT/US2020/057140 on Feb. 11, 2021 (11 pages).
Athavale, A. et al.; "Enabling Driving Cycle Loss Reduction in Variable Flux PMSMs via Closed-loop Magnetization State Control"; IEEE, Oct. 1, 2017, pp. 1932-1939 (8 pages).
Desai, C.; "Back EMF, Torque-Angle, and Core Loss Characterization of a Variable-Flux Permanent-Magnet Machine", IEEE Transactions on Transportation Electrification, vol. 5, No. 2, Jun. 1, 2019, pp. 371-384 (14 pages).
J. Huang, et al.; "Variable flux Memory Motor: A Review"; 2014 IEEE Conference and Expo Transportation Electrification Asia-Pacific, pp. 1-6; Aug. 31, 2014 (6 pages).
International Search Report for corresponding International Application No. PCT/US2020/027473, mailed Aug. 17, 2020 (20 pages).
Daan Moreels "Axial Flux vs Radial Flux: 4 Reasons Why Axial Flux Machines have a Higher Power Density" Magnax; Jan. 31, 2018 (6 pages).
D. Moreels et al. "This Inside-Out Motor For EVs is Power Dense and (Finally) Practical" IEEE Spectrum; Sep. 30, 2019 (8 pages).
Xu Hai et al., "Design of a Hybrid Magnets Variable Flux Memory Machine Based on Hysteresis Model", 2019 IEEE International Electric Machines & Drives Conference (IEMDC), IEEE, May 12, 2019 (May 12, 2019), p. 1889-1894, XP033588597.
International Search Report issued in corresponding International Patent Application No. PCT/US2021/012938 dated Way 11, 2021 (4 pages).
Written Opinion issued in corresponding International Patent Application No. PCT/US2021/012938 dated May 11, 2021 (8 pages).
"Investigation of magnetization characteristics of variable flux PM based on a Fourier-fitting hysteresis model", AIP Advances 9, 095059 (2019); https://doi.org/10.1063/1.1522766.
"Analysis of Magnetic Properties of AlNiCo and Magnetization State Estimation in Variable-Flux PMSMs", IEE Transactions on Magnetics, vol. 55, No. 7, Jul. 2019.
T. Li et al. "Multiphysics Analysis of an Axial-Flux In-Wheel Motor With an Amorphous Alloy Stator" IEEE Access, vol. 3;Feb. 13, 2020 (12 pages).
International Search Report issued in International Application No. PCT/US2021/028869, mailed Aug. 3, 2021 (5 Pages).
Written Opinion issued in International Application No. PCT/US2021/028869; Dated Aug. 3, 2021 (12 pages).
Lee Teschkler "Innovative electric motors sport axial designs" Designworld, Feb. 6, 2019 (5 pages).
D. J. Patterson et al. "A Comparison of Radial and Axial Flux Structures in Electrical Machines" IEEE, International Electric Machines and Drives Conference; 2009 (7 pages).

* cited by examiner

METHODS OF MAGNETIZING AND CONTROLLING A VARIABLE-FLUX MEMORY MOTOR

CROSS REFERENCE TO RELATED APPLICATIONS

This application claims priority, pursuant to 35 U.S.C. § 119(e), to U.S. Provisional Application No. 62/926,126 entitled, "METHODS OF MAGNETIZING AND CONTROLLING A VARIABLE-FLUX MEMORY MOTOR," filed on Oct. 25, 2019. The contents of which are hereby incorporated by reference in its entirety.

BACKGROUND

Synchronous electric motors with permanent magnets such as variable-flux memory motors have a wide range of applications in industrial, commercial, and residential, applications, such as fans, pumps, compressors, elevators, and refrigerators, industrial machinery, and electric motor vehicles because of their high efficiencies. Also, because of using permanent magnets instead of windings in the rotors of the synchronous electric motors, there is no need for a rotor cooling. These advantages along with others (e.g., being brushless) make the synchronous electric motors popular where high torque, high efficiency, or low maintenance for electric motors is needed.

SUMMARY

In one aspect, embodiments of the invention are directed to a method for magnetizing a soft magnet in a rotor of a variable-flux memory motor (VFMM). The method includes: generating a first pulse of electric current that has a duration of equal to or more than 0.1 millisecond (ms) and equal to or less than 2 ms; and applying the first pulse to a stator winding of the VFMM to set a magnetization state of the soft magnet to a first magnetization state when the first pulse ends.

Other aspects of the invention will be apparent from the following description and the appended claims.

DETAILED DESCRIPTION

Figure 1:
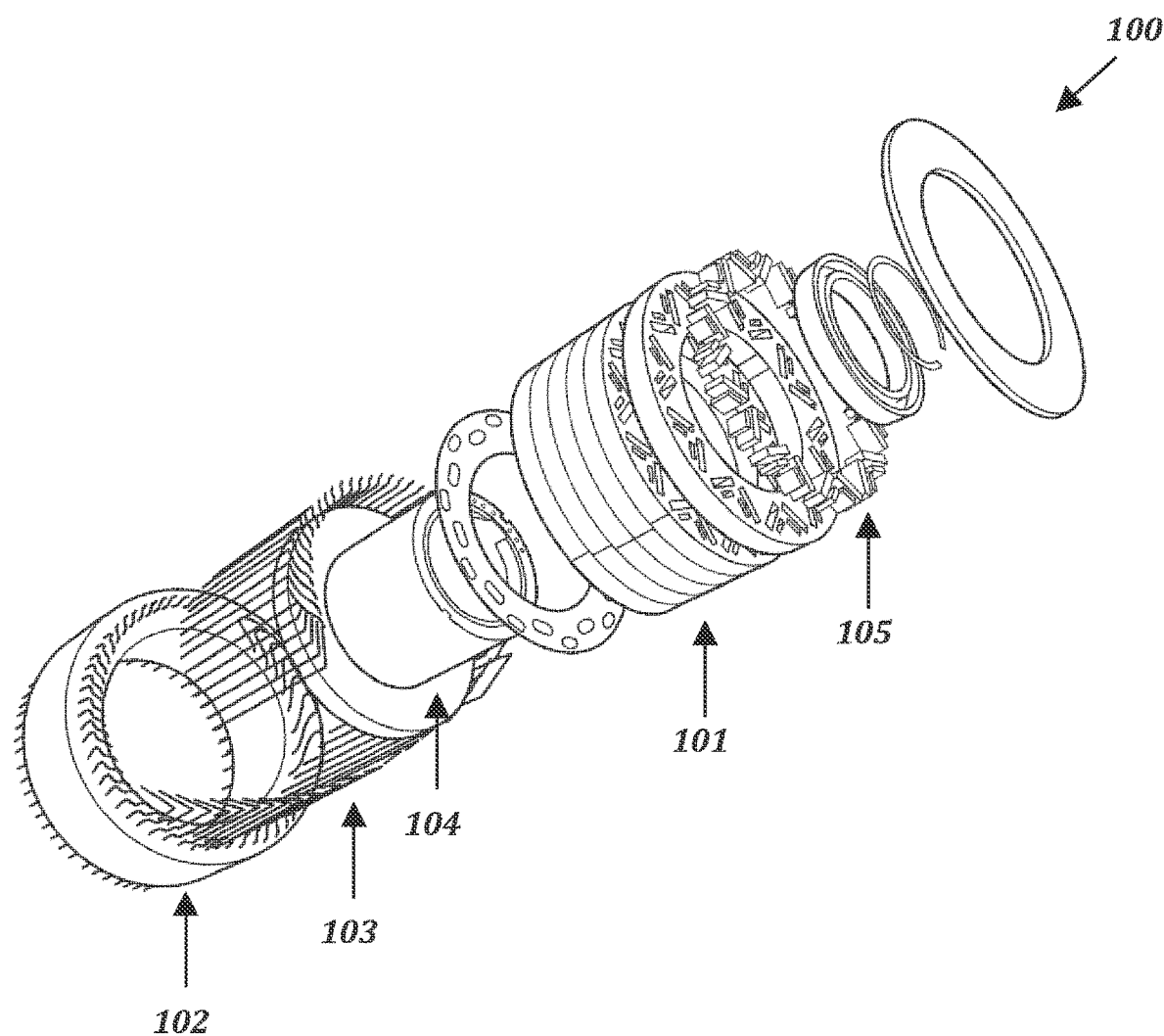
FIG. 1 shows a synchronous electric motor.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it would have been apparent to one of ordinary skill in the art that the invention may be practiced without these specific details. In other instances, well-known features have not been described in detail to avoid unnecessarily complicating the description.

FIG. 1 shows an exploded view of a conventional synchronous electric motor (100) (hereinafter, will be referred to as "synchronous motor") including a rotor (101), a stator (102), and stator windings (103) arranged around a rotor hub (104). The synchronous motor may also include a terminal box for connecting input power, a cooling fan, a rotor position sensor, temperature sensors, liquid cooling housings, etc. The rotor (101) includes multiple poles, each including permanent magnets (105) (PM).

The synchronous motor (100) operates via a three-phase AC input, in which each phase is delayed from the other two phases by 120 degrees. To create the three-phase AC input, a power converter may convert DC power fed to the power converter from a high voltage DC source (e.g., a battery). By applying the three-phase AC input to the synchronous motor, the stator windings create a three-phase magnetic field that interacts with the magnetic fields of the PMs (105) and cause the rotor (101) to rotate with a fixed number of revolutions per minute (RPM) speed in a steady-state (hereinafter, will be referred to as "RPM"). The RPM of the synchronous motor is fixed to limiting factors such as number of poles, available voltage, and flux linkage ($\lambda_m$), which is provided and is fixed by the PMs. Synchronous motors have a wide range of applications in industrial, commercial, and residential, applications, such as fans, pumps, compressors, elevators, and refrigerators, industrial machinery, and electric vehicles.

In one or more embodiments, because the $\lambda_m$ provided by the PMs is fixed, the synchronous motors with PMs have a narrow constant power speed range (CPSR), which is the speed range at which the drive of the motor can maintain a constant power with limited values of input voltage and current of the motor. Thus, increasing the CPSR of the synchronous motors without using advanced control techniques such as implementing flux-weakening control methods is difficult. Because of the narrow range of CPSR for the synchronous motors, using a transmission system may be required to change a CPSR of a system driven by the synchronous motor. Even using such advanced methods extend the CPSR of the synchronous motors to 2 to 3. On the other hand, the CPSR of the VFMM according to one or more embodiments may achieve 4 to 6.

In general, embodiments of the invention relate to designs of VFMMs, rotors for VFMMs, and methods for magnetizing VFMMs. A VFMM is a type of synchronous motor in which magnetization of rotor magnets of the VFMM can be adjusted (i.e., changed) during an operation of the VFMM. The adjustment of the magnetization of the rotor magnets (hereinafter, will be referred to as "VFMM magnetization" for simplicity) changes the RPM of the VFMM. According to one or more embodiments, to facilitate the change in the VFMM magnetization, the rotor magnets are made of a soft-ferromagnetic material such as aluminum nickel cobalt (AlNiCo) or some types of ceramics. Hereinafter, the rotor magnets made of a soft-ferromagnetic material will be referred to as "soft magnets." The soft magnets are Low Coercive Force Magnets (LCF). According to one or more embodiments, the soft magnets may be AlNiCo with grades 1-9 or magnets comprised of AlNiCo, cast, ceramics, some grades of samarium cobalt, or sintered construction of these materials. It is apparent that one of ordinary skill in the art could use specific amounts of these materials to achieve a desired function of the VFMM.

The VFMM in accordance with one or more embodiments is a better substitute to a synchronous motor because a maximum achievable RPM with a limited voltage of the VFMM may be more efficiently attained through changing the VFMM magnetization. In other words, the CPSR of the VFMM could have a wider range compared to the CPSR of the synchronous motor. Thus, there is no need to couple the transmission system to the VFMM.

According to one or more embodiments, the soft magnets can be quickly and efficiently magnetized and demagnetized while the soft magnets are assembled inside the motor. Accordingly, using the VFMM potentially reduces manufacturing costs of electric motor-equipped systems due to being magnetized or demagnetized during assembly.

Soft-ferromagnetic materials have high permeability (same as hard-ferromagnetic materials such as alloys of iron and nickel) but low coercivity (unlike hard-ferromagnetic materials). Because of the low coercivity of soft-ferromagnetic materials, changing the magnetization of soft-ferromagnetic materials requires relatively smaller magnetic field compared to hard-ferromagnetic materials.

In one or more embodiments, only soft magnets may be used as the magnets of the rotor of the VFMM and there may be no hard magnets (i.e., magnets made of hard-ferromagnetic materials) mounted on the rotor. Alternatively, in one or more embodiments, both of the soft magnets and hard magnets may be used as the magnets of the rotor of the VFMM. Embodiments of the invention may have advantages over synchronous motors, which use only hard magnets, because hard magnets are made of rare-earth materials and are significantly more expensive than soft magnets (e.g., AlNiCo). Thus, partially or entirely using soft magnets instead of hard magnets in the VFMM significantly reduces manufacturing costs of the VFMM compared to traditional synchronous motors.

Additionally, another advantage of using the soft magnets is that control and change of the overall magnetization of the overall magnets of the VFMM can be done in a wide range. According to one or more embodiments, the overall magnetization of the soft magnets can be changed to any value from 0% magnetization (i.e., the soft magnets are completely demagnetized) to 100% magnetization (i.e., the soft magnets are magnetized to their maximum capacity). This change in magnetization may occur in a short time (e.g., about 1 millisecond).

In contrast, hard magnets do not tend to change their magnetization easily. Accordingly, changing the magnetization of hard magnets requires significantly more power than the operating power of a VFMM or other types of synchronous motors. For example, changing magnetization of hard magnets, such as some grades of neodymium iron boron (NdFeB) and samarium cobalt (SmCo) may require a power more than 10 folds higher that a power required for changing magnetization of the soft magnets.

According to one or more embodiments, a current (hereinafter, will be referred to as the "glitch current") may be generated due to an unwanted glitch in the VFMM or a controller that controls the VFMM. If a current that is significantly higher than operational current of the stator windings passes the stator windings, this current may temporarily change the magnetization of the soft magnets to an unwanted value. However, it will be easy to revive the magnetization of the soft magnets by another current that is bearable by the stator windings. No matter how high the glitch current be, the magnetization of the soft magnets can be revived via a relatively smaller current than the glitch current because soft magnets can easily accept a different magnetization (compared to hard magnets that require a high current to change magnetization).

On the other hand, if a synchronous motor that has soft magnets (such as a VFMM) includes hard magnets and the glitch current changes the magnetization of the hard magnets, reviving the magnetization of the hard magnets via a current in the stator windings will be difficult. Such a current capable of reviving the hard magnets may be too high to bear for the stator windings or other parts of the synchronous motor. For example, such a high current may burn the stator windings or may dislocate various components of the synchronous motor such as the rotor and the windings. To revive the hard magnets, the synchronous motor must be opened and the hard magnets must be separated from the synchronous motor to be placed under a high magnetic field. However, as explained above, reviving the soft magnets does not require disassembling the VFMM.

In one or more embodiments, a certain number or amount of hard magnets may be used to create a magnetization baseline for the VFMM. Because the magnetization of the hard magnets is reluctant to change, the magnetization of the hard magnets will be the magnetization baseline, and the magnetization of the soft magnets will change the overall magnetization from the magnetization baseline (to higher or lower magnetization from the baseline, depending on the torque and RPM of the VFMM).

Figure 2:
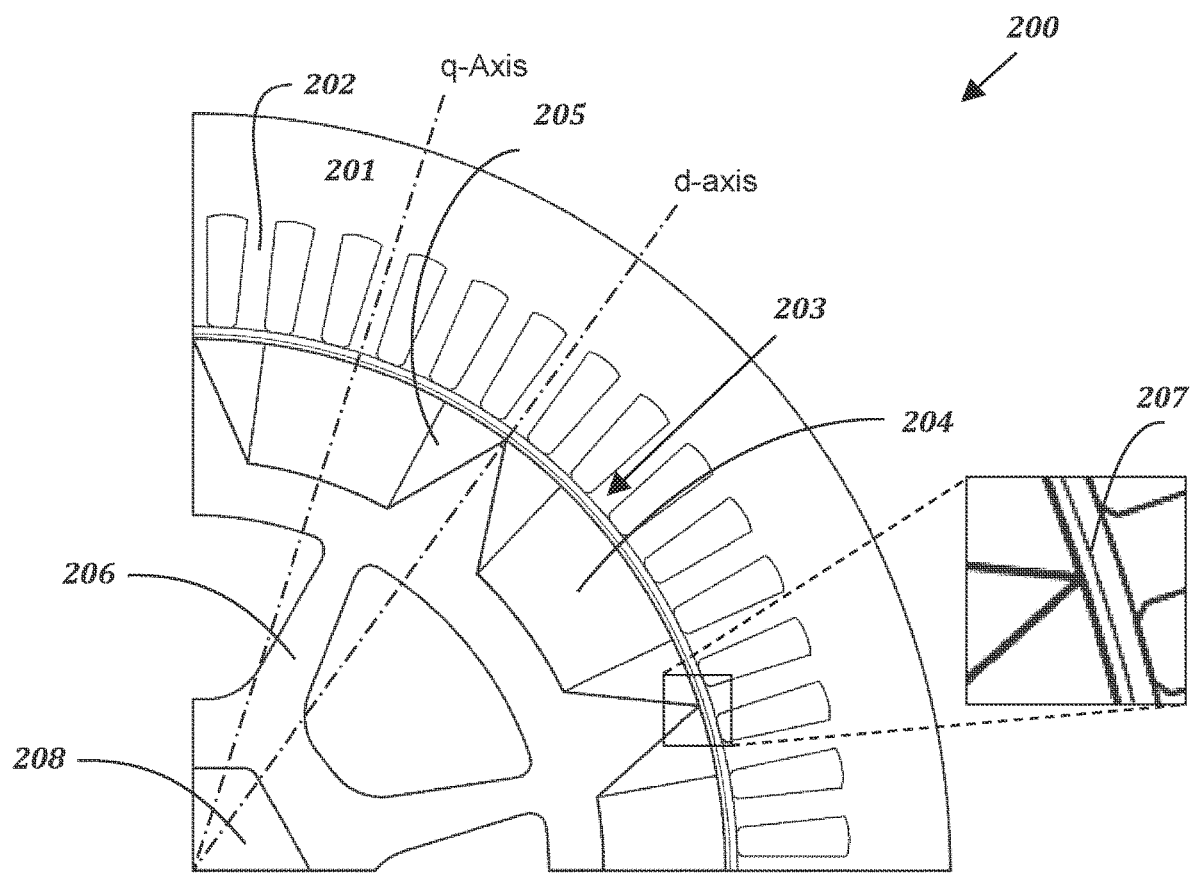
FIG. 2 shows a cross-sectional view of a variable-flux memory motor (VFMM) in accordance with one or more embodiments of the invention.
Figure 3A:
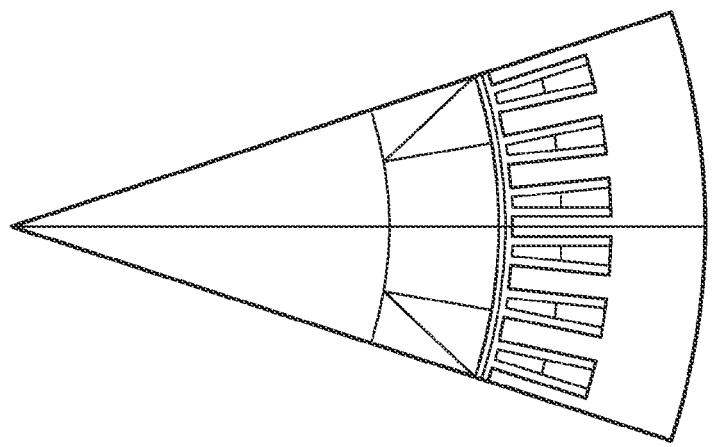
FIG. 3 shows magnetization curves of VFMM rotors in accordance with one or more embodiments of the invention.
Figure 3A:
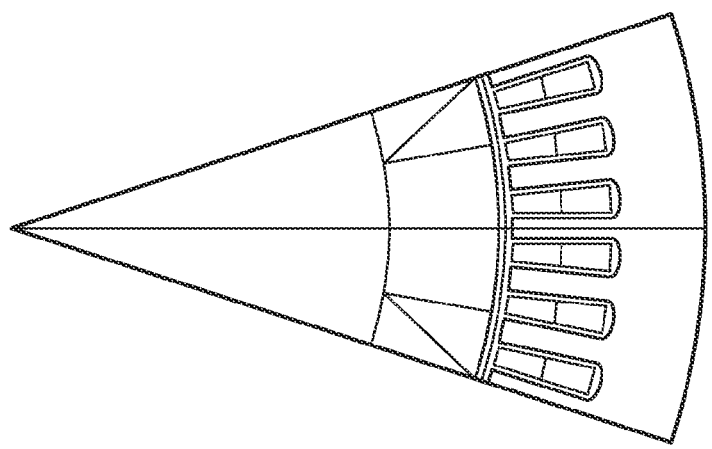
Figure 3B:
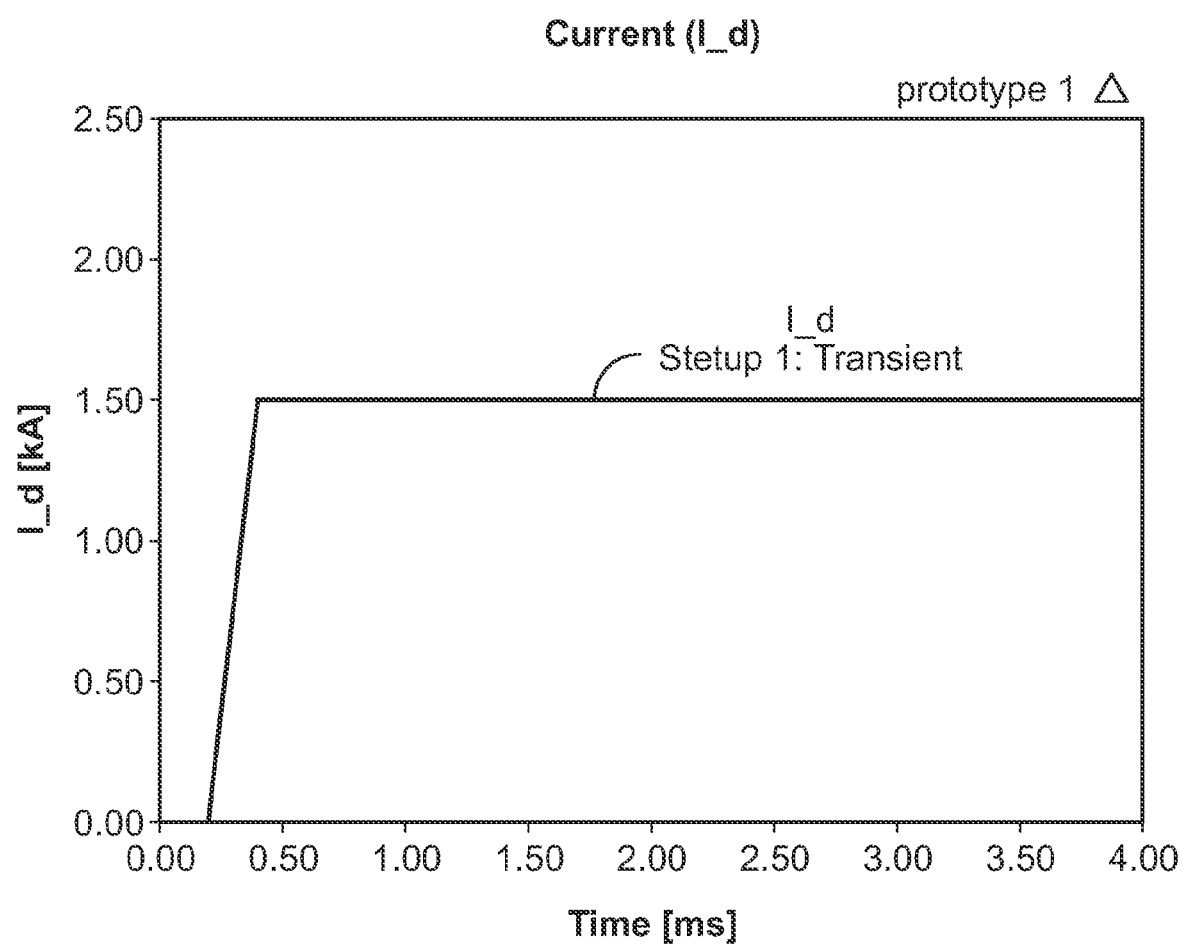
Figure 3C:
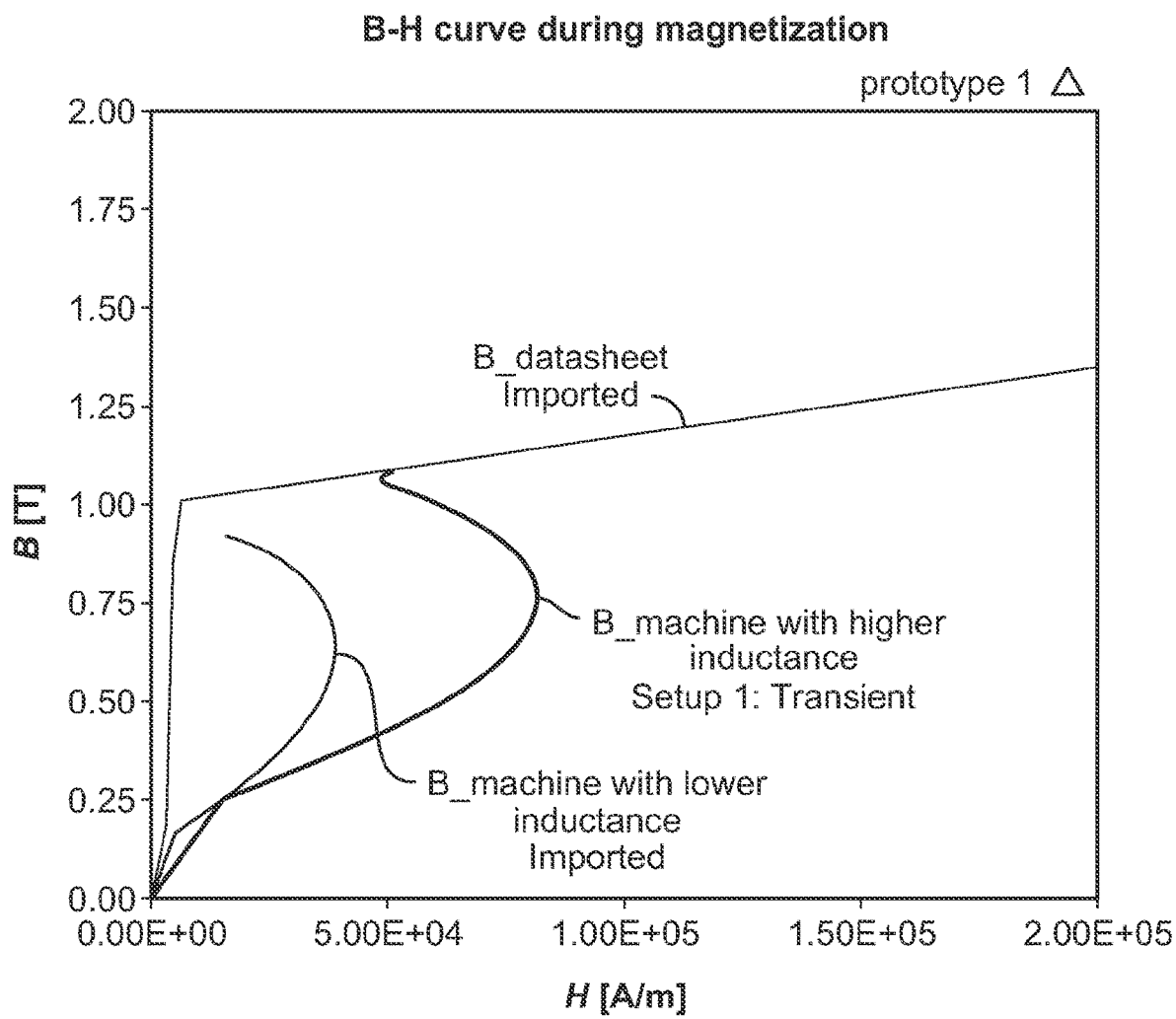

FIG. 2 shows a cross-sectional view of the VFMM (200) in accordance with one or more embodiments of the invention. The VFMM (200) of FIG. 2 includes a stator (201) that holds the stator windings in slots between adjacent stator teeth (202), and a rotor (203). The rotor (203) includes the soft magnets (204) and ferrous wedges (205) that are mounted on a rotor core (206). The rotor (203) is mounted on a shaft (208). The rotor (203) includes a sleeve (207) that keeps the soft magnets (204) and ferrous wedges (205) together. The sleeve (207) may be 0.5 to 3 millimeter (mm) thick in the radial direction. The thickness is determined by the centrifugal force exerted by the soft magnets (204) and the ferrous wedges (205). Alternatively, in one or more embodiments, the sleeve (207) may adhere to any one of the soft magnets (204), the ferrous wedges (205), and/or the rotor core (206).

In these embodiments, the sleeve (207) may be from a non-binding material, which does not adhere to the soft magnets (204), the ferrous wedges (205), and/or the rotor core (206). The non-binding sleeve (207) may be from carbon fiber HEX TOW IM10 or a Kevlar tow (i.e., Kevlar twine). Alternatively, the sleeve (207) may be a part of the rotor assembly.

The d-axis (direct axis) and q-axis (quadrature axis) for the VFMM (200) are shown in FIG. 2. D-axis is the axis in which the magnetic field of the rotor is at its peak. For example, d-axis in FIG. 2 is in the middle of the adjacent poles that is between the adjacent ferrous wedges (205) where the magnetic field of the rotor (203) is the highest. The q-axis is away from the d-axis by 90 degrees phase. For example, q-axis in FIG. 2 is between the soft RMs (204) of each of the poles where the magnetic field of the rotor (203) is the lowest.

More details about embodiments of the VFMM is disclosed in U.S. patent application Ser. No. 16/383,274 entitled "A VARIABLE-FLUX MEMORY MOTOR AND METHODS OF CONTROLLING A VARIABLE-FLUX MOTOR" and filed on Apr. 12, 2019, which is incorporated herein by reference in its entirety.

In one or more embodiments of the invention, effects of inductances of VFMMs are disclosed. FIG. 3 shows Design 1 of VFMM that corresponds to an inductance of 200 micro Henry ($\mu$H) and Design 2 of VFMM that corresponds to an inductance of 33 $\mu$H. A step electric current with a uniform amplitude of 1.5 kilo ampere (kA) is fed to the VFMMs and magnetizations (i.e., B-H curves) of the VFMMs in response to the step electric current are plotted, as shown in FIG. 3. In the magnetization plots, the areas under the magnetization curves (i.e., the areas between the magnetization curves and the "B" (magnetic field) axis) illustrate energies consumed by the VFMMs. Accordingly, the energy consumed by the VFMM of Design 2 (which has the lower inductance) is about 50% lower than in Design 1 (which has the higher conductance). This reduction of the consumed power is significant considering that the maximum magnetization (i.e., the highest magnetic field (B)) of the VFMM for Design 2 is only about 16% lower than the maximum magnetization of the VFMM for Design 1.

To magnetize the VFMM, an electric current is applied in the d-axis to the soft magnets. Then, the electric current is removed to maintain the torque of the VFMM high. Thus, pulses of electric current are normally fed to the VFMM. In one or more embodiments of the invention, durations of the pulses of electric current are reduced to increase the efficiency of the VFMM (i.e., decreasing the power consumed by the VFMM to achieve a predetermined level of magnetization of the soft magnets). These findings are explained below with reference to FIGS. 4A-4C and 5.

Figure 4A:
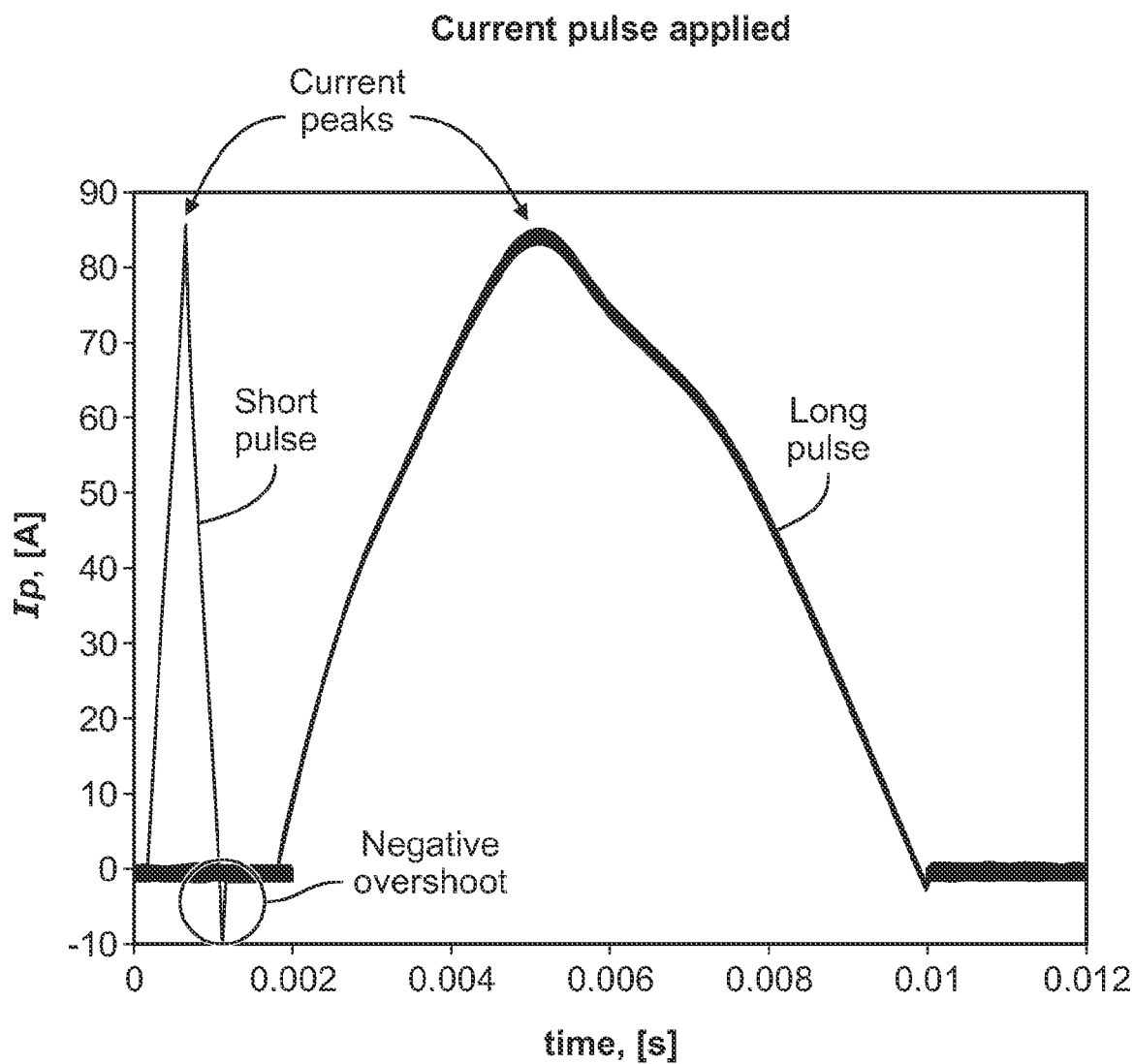
FIG. 4A shows pulses of electric current to magnetize a soft magnet in accordance with one or more embodiments of the invention.

FIG. 4A shows a triangular-shape long pulse with a duration of about 18 millisecond (ms) (long pulse), which is a typical pulse duration for magnetizing low-power VFMMs (i.e., less than 30 kilowatt (kW)), and a triangular-shape short pulse with a duration of about 1 ms (short pulse). The 1 ms pulse is significantly shorter than typical pulse durations for high-power VFMMs (i.e., more than 100 kW), which are more than 2 ms. In one or more embodiments, a duration of a pulse is a time period in which an amplitude of the pulse of electric current is equal to or higher than 10% of the peak amplitude of the pulse. The short pulse in FIG. 4A has a negative overshoot that can be filtered.

Figure 4B:
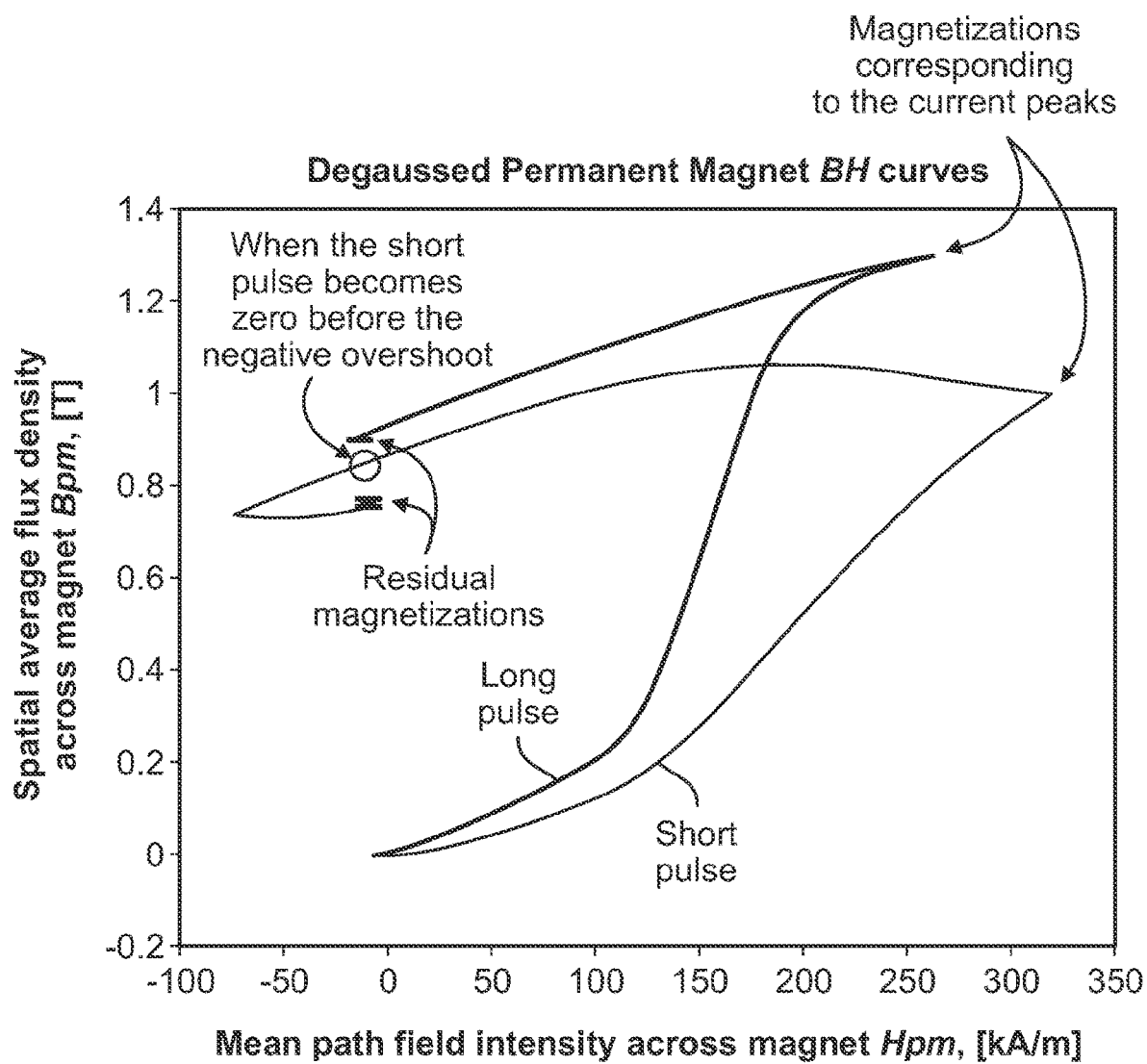
FIG. 4B shows magnetization curves of the soft magnet in response to the pulses of electric current shown in FIG. 4A.

FIG. 4B shows magnetization curves of an AlNiCo-9 soft magnet in response to the pulses shown in FIG. 4A. When the electric currents increase from zero to the peak amplitude of the pulses, the average magnetic flux in the soft magnet increases. At the peak amplitude, the average magnetic flux of the soft magnet corresponding to the longer pulse (having the duration of 18 ms) is higher than the average magnetic flux of the soft magnet corresponding to the shorter pulse (having the duration of 1 ms) by 0.3 Tesla (T). However, when the pulses decay from the peak amplitude to zero, the average magnetic flux of the soft magnet corresponding to the longer pulse decreases more than the average magnetic flux corresponding to the shorter pulse. As shown in FIG. 4B, when the pulses decay to zero before becoming negative in an overshoot, the average magnetic flux of the soft magnet corresponding to the longer pulse is only about 0.05 T higher than the average magnetic flux corresponding to the shorter pulse.

Figure 4C:
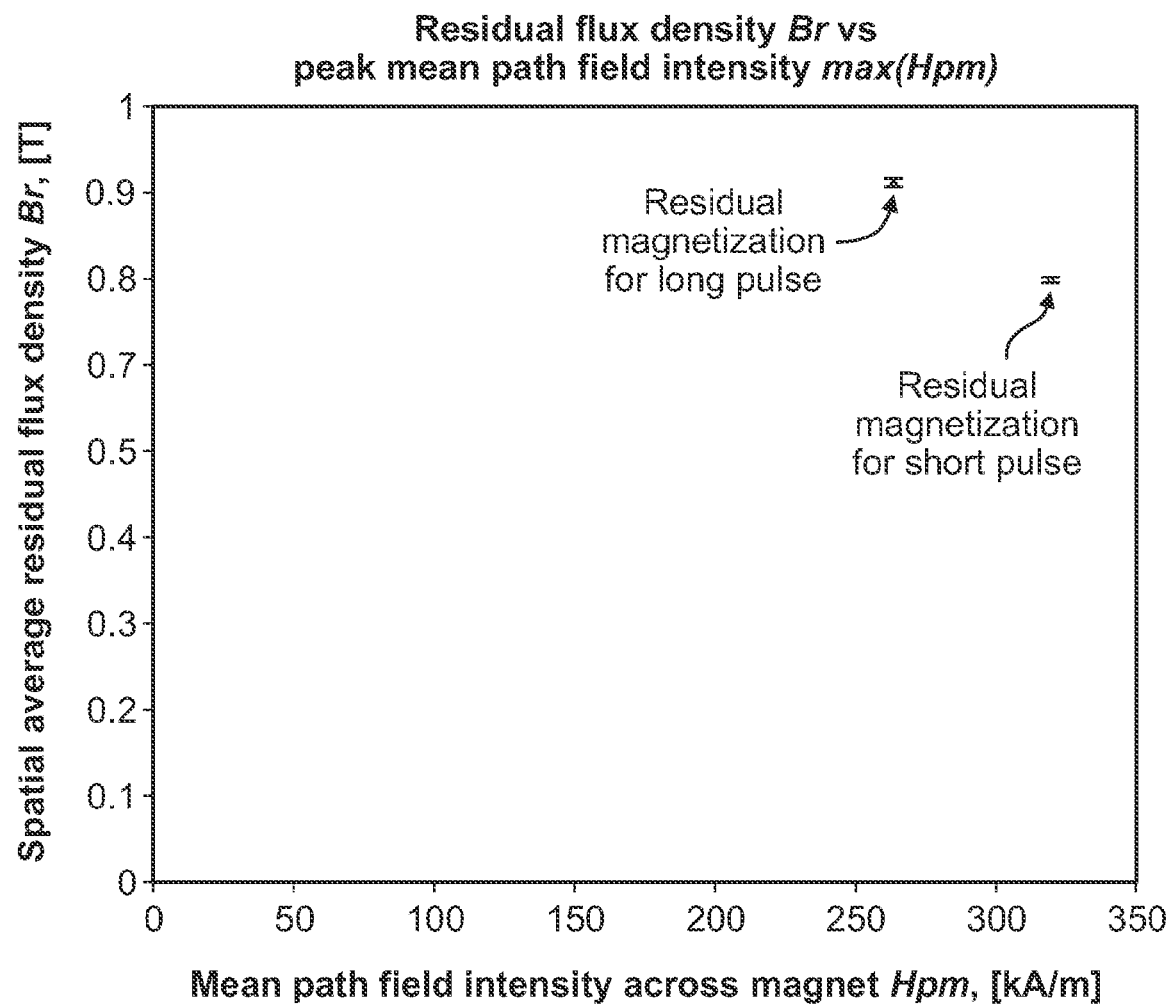
FIG. 4C shows residual magnetizations corresponding to the magnetization curves shown in FIG. 4B.

Although FIGS. 4B and 4C are prepared for the AlNiCo-9 soft magnet, one of ordinary skill in the art understands that the invention is not limited to only AlNiCo-9, and the embodiments of the invention may expand to other types of soft magnetic materials. For example, the embodiments of the invention may expand to other grades of AlNiCo.

As shown in FIG. 4B, at the negative overshoot, the shorter pulse becomes negative in a negative overshoot and then stabilizes at zero (i.e., stable zero current). Even after the negative overshoot, the average magnetic flux of the soft magnet corresponding to the longer pulse is only about 0.15 T higher than the average magnetic flux of the soft magnet corresponding to the shorter pulse. In other words, when the two pulses decay to zero from the same peak amplitude, the demagnetization of the soft magnet would be less in response for the shorter pulse. Hereinafter, the average magnetic flux at the current that is stably zero after the pulse is referred to as "residual magnetization." FIGS. 4B and 4C show the residual magnetizations of the soft magnet corresponding to the longer and shorter pulses shown in FIG. 4A.

According to FIG. 4B, the residual magnetization of the soft magnet in response to the shorter pulse is about 16% lower than in response to the longer pulse, while the electric power consumed by the shorter pulse is about 5% of the electric power consumed by the longer pulse. Thus, high magnetization of the soft magnet with significantly less electrical power can be achieved.

In one or more embodiments of the inventions, the duration of the pulse of electric current may be equal to or more than 0.1 ms. In one or more embodiments of the invention, the duration of the pulse of electric current may be equal to or more than 0.3 ms and equal to or less than 2 ms. More specifically, the duration of the pulse may be equal to or more than 1 ms. In one or more embodiments, the duration of the pulse may be equal to or more than 1 ms and only one pulse magnetizes the soft magnet, as shown in FIGS. 4A-4C.

Figure 5A:
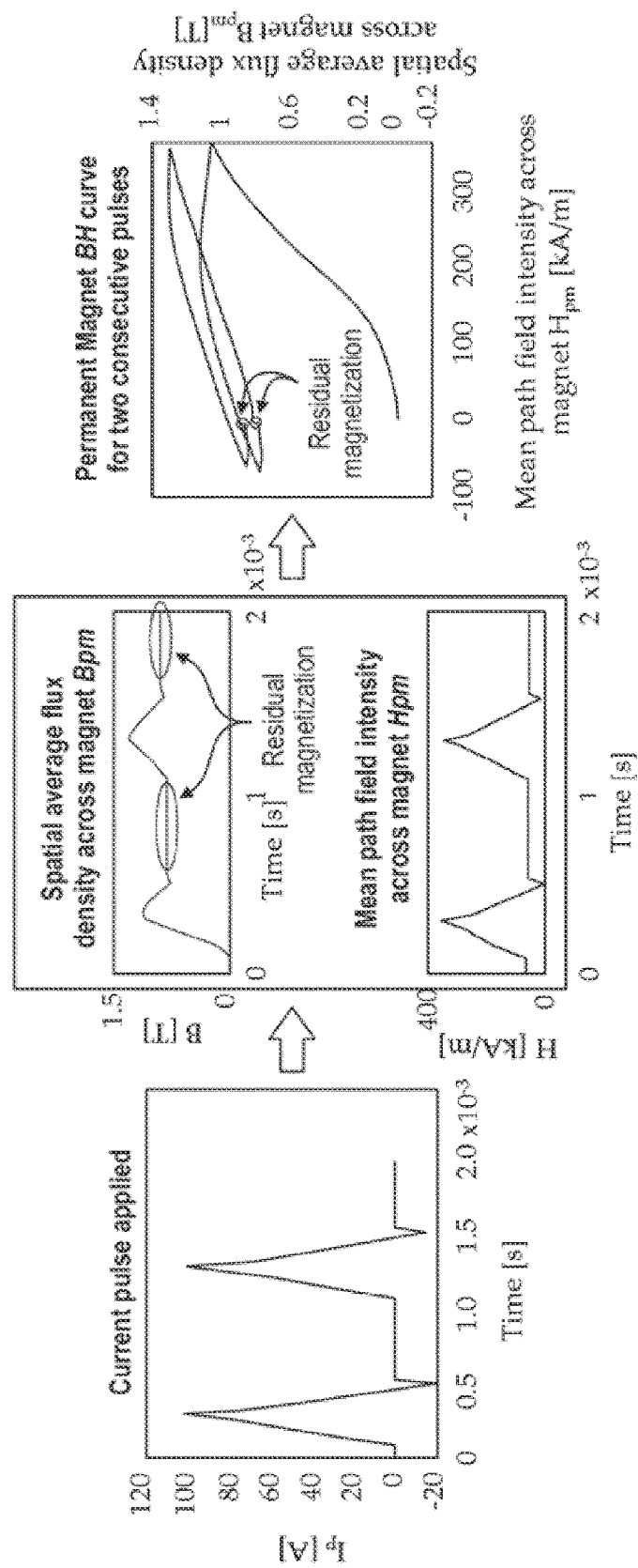
FIG. 5A shows magnetization of a soft magnet in response to pulses of electric current in accordance with one or more embodiments of the invention.

In one or more embodiments of the invention, multiple consecutive pulses that each has a duration of less than 1 ms may magnetize the soft magnet. By using the multiple consecutive short pulses, the residual magnetization of the soft magnet may be increased while keeping the power consumption low. FIG. 5, which is an example of these embodiments, shows that two consecutive pulses that each has a duration of about 0.5 ms is used to magnetize the soft magnet. After the first pulse, the residual magnetization of the soft magnet remains at about 0.8 T. Then the second pulse increases this residual magnetization to a higher residual magnetization of about 0.9 T. The amount of power consumed by the combination of pulses in FIG. 5 is about 8% of the power consumed by the longer pulse shown in FIG. 4A, while the residual magnetizations in response to the combination of pulses in FIG. 5 and the longer pulse shown in FIG. 4A is almost the same.

In one or more embodiments of the invention, more than two consecutive pulses may be used to magnetize the soft magnet. For example, 10 consecutive pulses each having a duration of 0.5 ms may be used in a time period of 10 ms. Even with the 10 consecutive pulses, the total power consumed by the pulses would be about 30% of the 18 ms long pulse shown in FIG. 4A. Thus, with using short pulses, high magnetization of soft magnets in a VFMM can be achieved while a power consumed to magnetize the soft magnets can be significantly reduced.

Figure 5B:
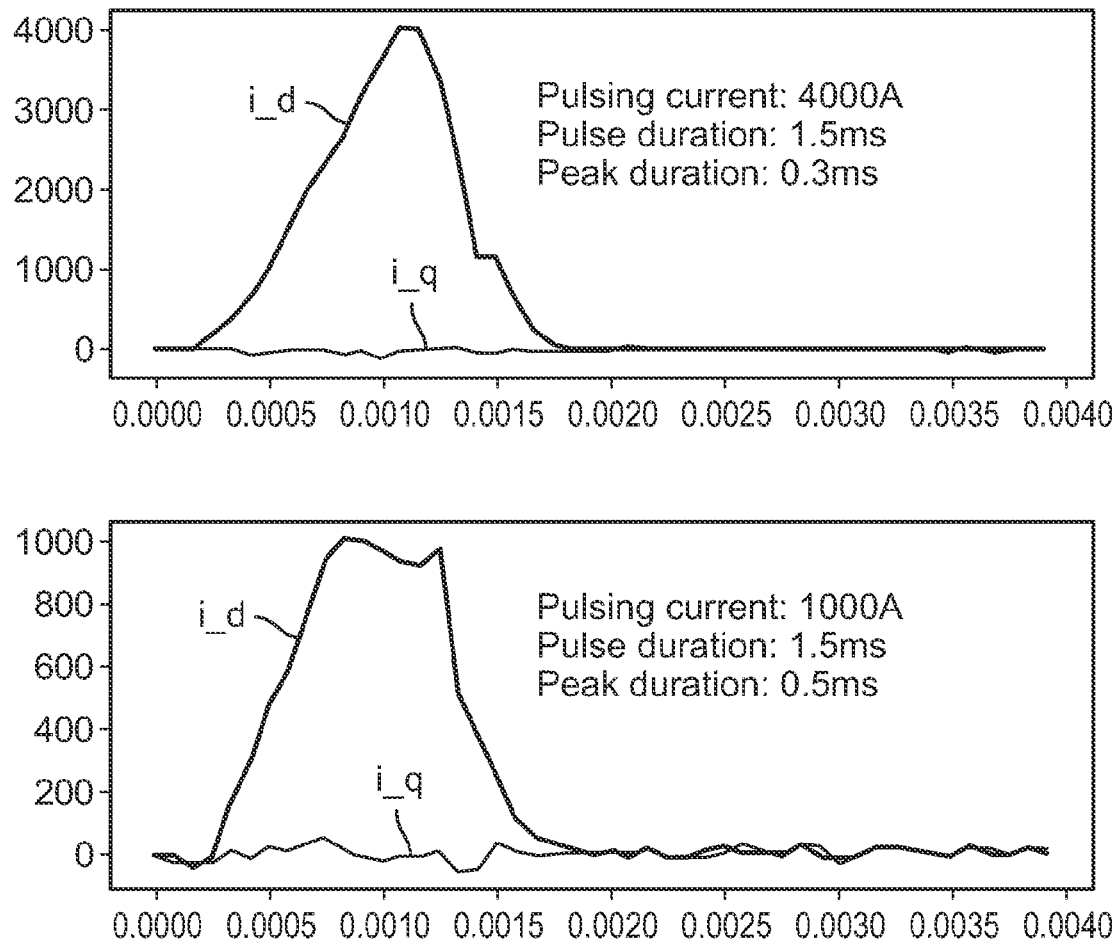
FIG. 5B shows current pulses for magnetization of a soft magnet in accordance with one or more embodiments of the invention.

The duration and shape of the current pulses may depend on practical limitations of the power supply that provides the required amount of energy for magnetizing the soft magnet. For example, assume that the soft magnet is completely demagnetized (a current MS of the soft magnet is 0%) and that magnetizing the soft magnet to 20% MS and 100% MS requires 1000 A and 4000 A direct-axis current ($I_d$), respectively. If these two currents are given in pulses with the same duration to the soft magnet, the shape of the current pulses that the power source may be different depending on the power supply's capability, as shown in FIG. 5B.

The capability of the power supply to provide short current pulses depends on the inductance of the circuit (e.g., the widenings used for magnetizing the soft magnet) for which the current pulse is provided. For example, for larger windings having a higher inductance, the time constant of the current pulse would be higher. In other words, for a larger winding inductance, it takes longer for the current pulse to reach a target current peak.

Figure 6A:
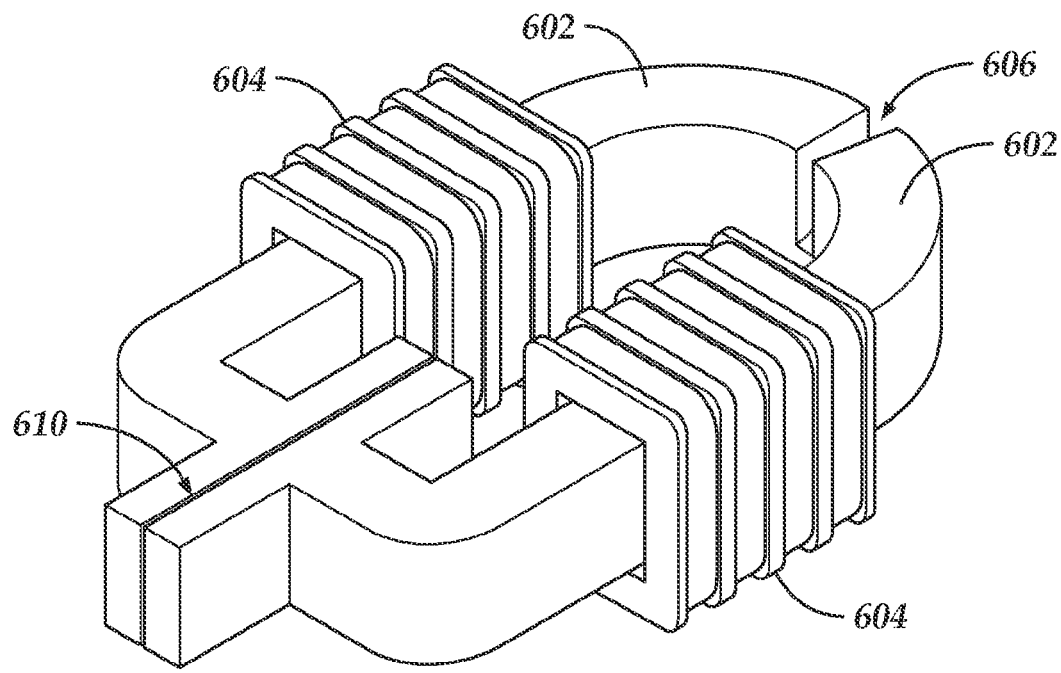
FIGS. 6A-6B show devices for measuring magnetization of a soft magnet.
Figure 6B:
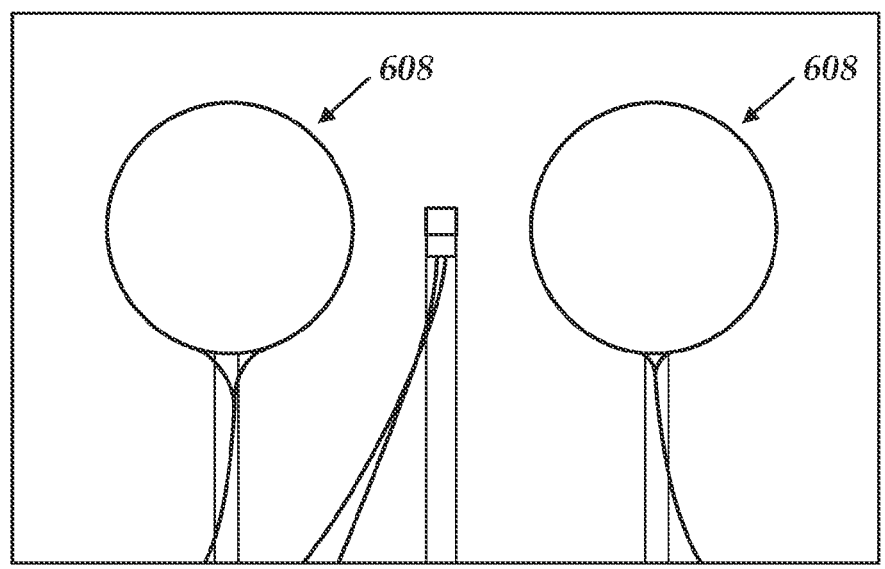

FIGS. 6A-6B show setups for magnetizing the soft magnet and measuring the magnetization curves shown in FIGS. 4B and 5. In FIG. 6A, two ferrous parts (602) are disposed next to each other. Magnet coils (604) are disposed around the ferrous parts (602) to induce a magnetic flux inside the ferrous parts (602) upon applying an electric current (e.g., a pulse of electric current) to the magnet coils (604). The soft magnet to be magnetized is disposed in a gap (606) between the ferrous parts (602). The induced magnetic flux inside the ferrous parts (602) magnetizes the soft magnet. To measure the magnetization curves of the soft magnet, one or more measuring coils (608) are disposed in a small air gap (610) between the ferrous parts (602). The magnetic flux of the soft magnet is measured via an electrical signal induced in the measuring coils by the magnetic flux of the ferrous parts (602).

Figure 7A:
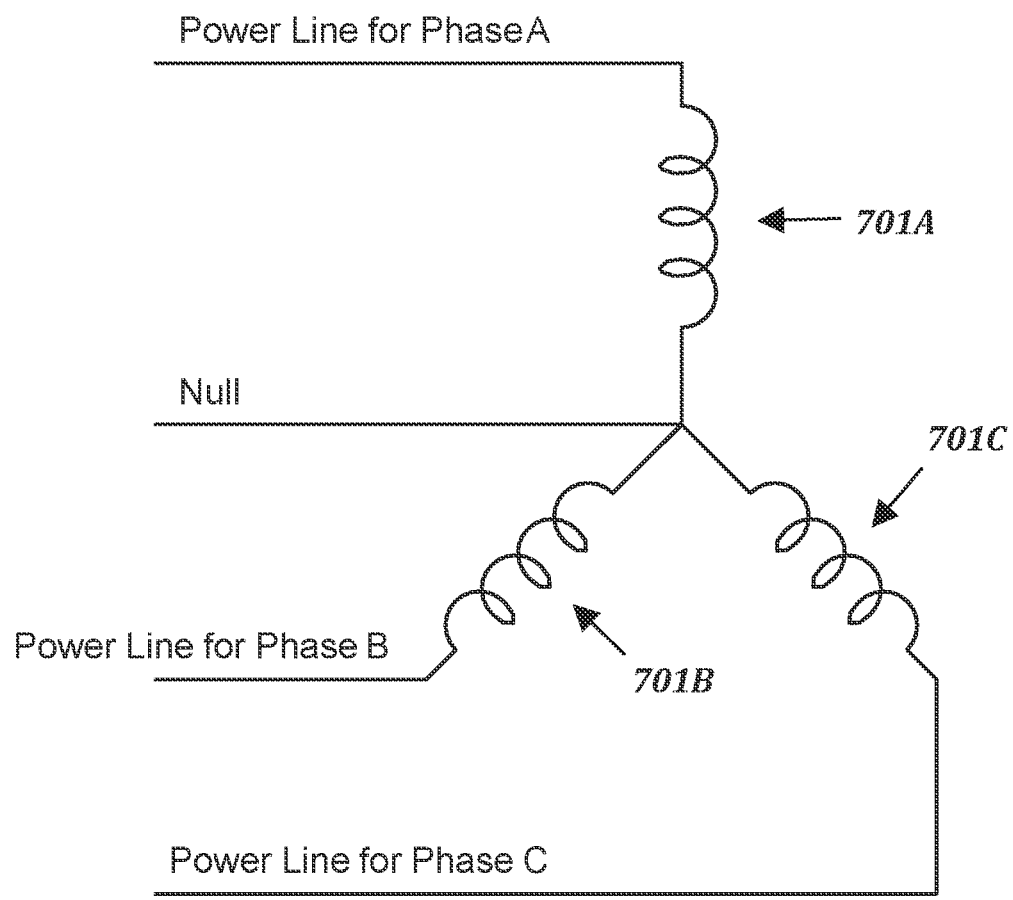
FIG. 7A shows a simplified circuit model of stator windings of the VFMM in accordance with one or more embodiments of the invention.

According to one or more embodiments, the stator windings create the magnetic flux necessary to magnetize the VFMM and rotate the rotor. FIG. 7A shows a simplified circuit model of the stator windings that are wound in a wye configuration. There are three stator windings (i.e., first stator winding (701A), second stator winding (701B), and third stator winding (701C)) that carry phases A, B, and C, which are delayed from each other by 120 degrees. For example, if phase A is zero, phase B is 120 degrees and phase C is −120 degrees. The three stator windings are connected to a null. Each of the three stator windings may include multiple winding coils that are wound in the same direction and are connected with each other.

Figure 7B:
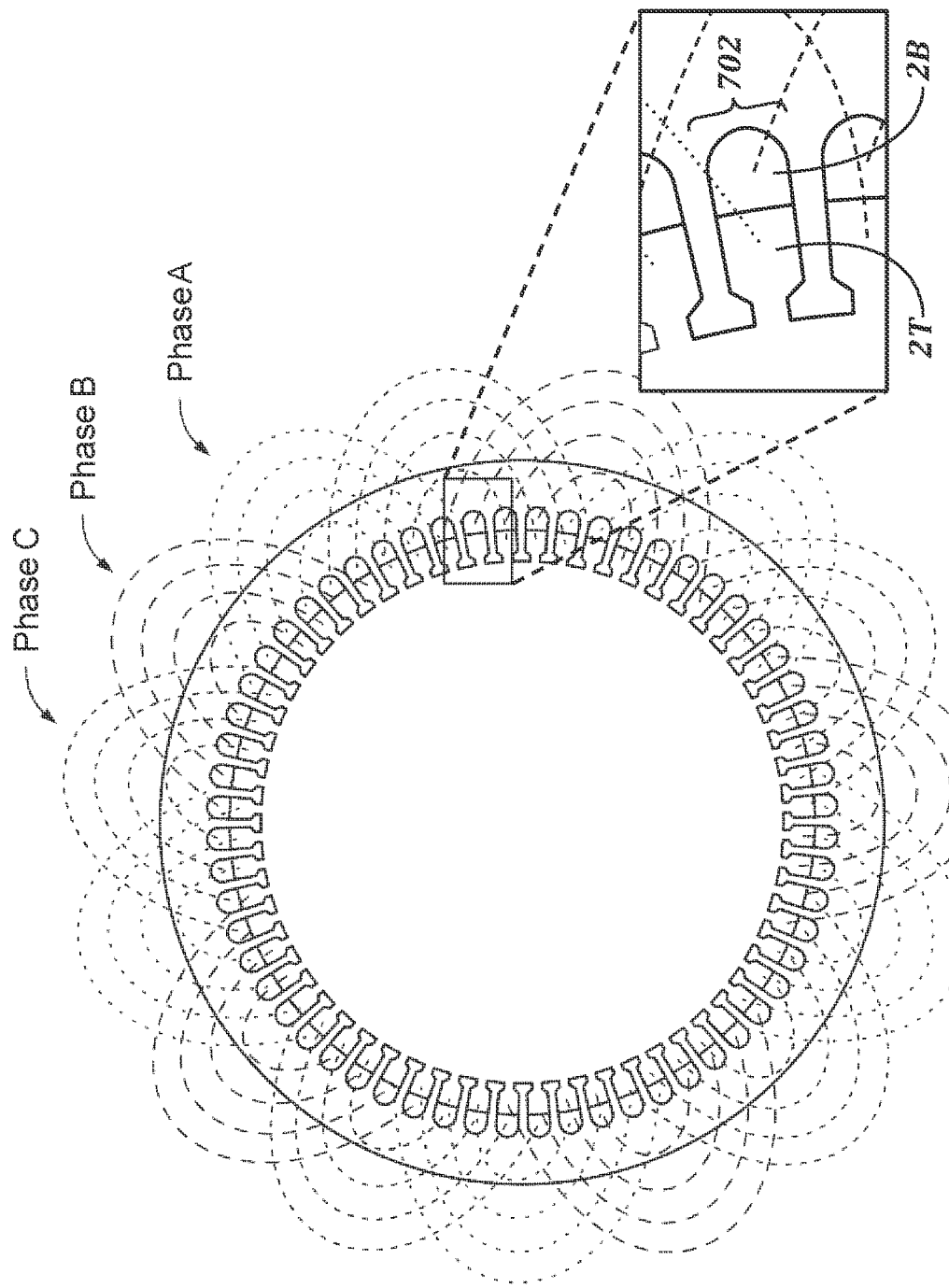
FIG. 7B shows stator windings of the VFMM in accordance with one or more embodiments of the invention.

FIG. 7B shows how the three stator windings are wound in the stator by way of an example in accordance with one or more embodiments. Each of the stator windings includes a plurality of winding coils. In the example shown in FIG. 7B, each of the stator windings for phases A, B, and C includes 20 winding coils. For each of the three phases, the winding coils carry a single phase (i.e., one of phases A, B, and C).

In the example shown in FIG. 7B, each of the stator slots (702) accommodates one end of one winding coil and one end of another winding coil. For example, stator slot 2 shown in the magnified view of FIG. 7B includes a top section (2T) that accommodates an end of a winding coil for phase A and a bottom section (2B) that accommodates an end of a winding coil for phase B.

Figure 7C:
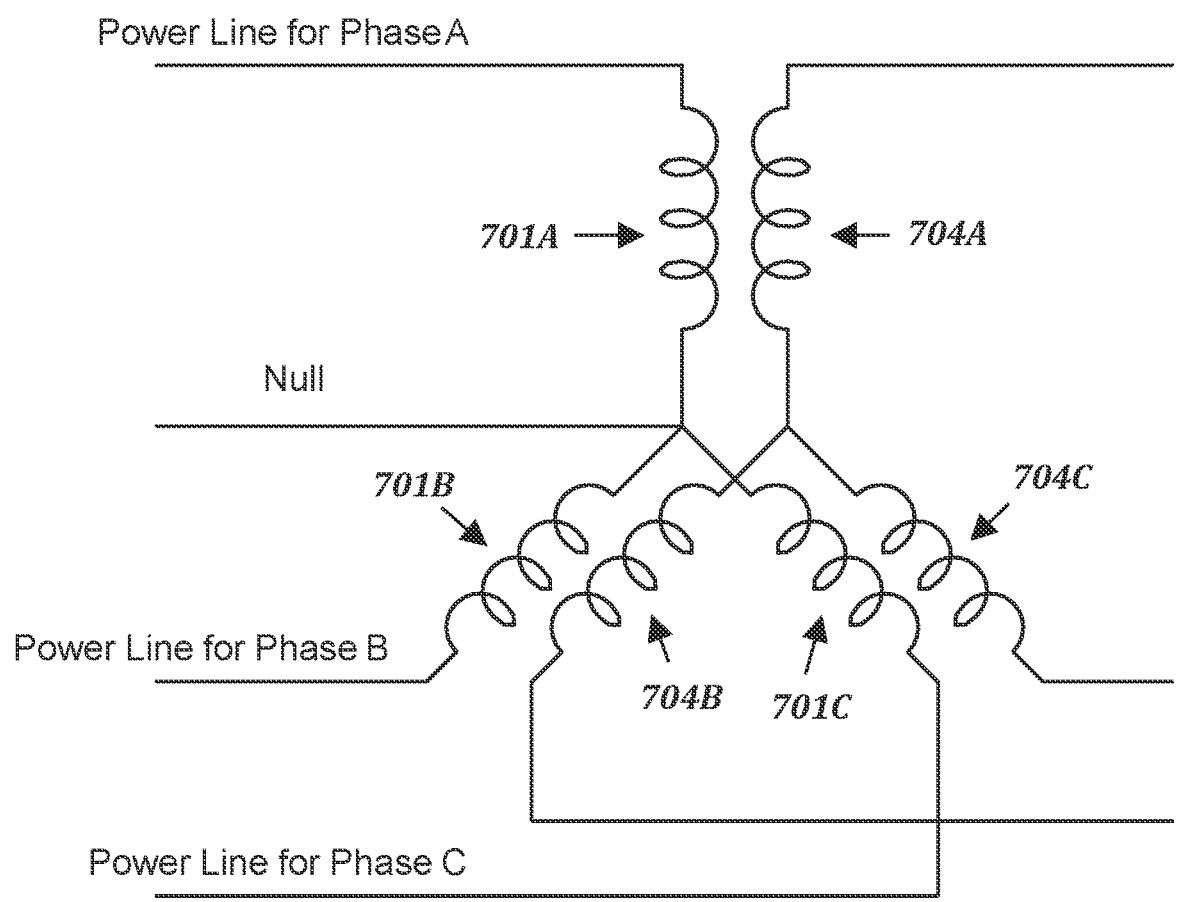
FIG. 7C shows a simplified circuit model of stator windings and sense coils of the VFMM in accordance with one or more embodiments of the invention.

According to one or more embodiments, each of phases A, B, and C may have a sense coil (in addition to the winding coils) to measure the MS of the soft magnets. Thus, there may be three sense coils (i.e., first, second, and third sense coils). The sense coils can be disposed on or embedded in the stator windings, but the sense coils are electrically insulated from the stator windings. FIG. 7C shows a simplified circuit model of the first, second, and third stator windings (701A, 701B, 701C, respectively) with first, second, and third sense coils (704A, 704B, 704C, respectively) corresponding to phases A, B, and C, respectively, that are wound in the wye configuration. One of ordinary skill in the art would have appreciated that the stator windings and sense coils may be wound in a Δ (delta) configuration to achieve specific functions.

In one or more embodiments, because a high current pulse may be required for magnetizing or demagnetizing the soft magnets, the stator windings may be wound in the wye configuration because in the wye configuration, the current pulse in a power line of the VFMM for each phase is equal to the current in the stator winding for that phase. Thus, the current in the stator windings may be directly controlled and simply measured by controlling and measuring the current in the power lines. However, in the Δ configuration, the currents of the stator windings are not necessarily equal to the currents of the power lines.

In one or more embodiments, the sense coils inductively generate a back electromotive force (bemf) using the magnetic flux of the soft magnets. The strength (amplitude) of the bemf indicates the MS of the soft magnets and the rotor position. The bemf has parameters that have fixed values such as inductances and resistances. The bemf also have parameters with variable values such as angular velocity, angular position, and current. In one or more embodiments, to measure the MS of the soft magnets, these fixed and variable-value parameters must be known.

According to one or more embodiments, the voltages between the three wires of the sense coils shown in FIG. 7C are measured and then, a conversion ratio is applied to obtain the actual voltages between the phases of the stator windings. The conversion ratio is the number of turns ratio between sense coils vs stator windings. For example, the number of turns for the each of the stator windings may be 190. In this example, if for each of the winding coils only one turn of the sense coil is used, the number of turns of the sense coil for each of the phases is 20. Thus, the conversion ratio in this example is 20/190≈0.105. In one or more embodiments, the conversion ratio for a 175 kW VFMM may be 0.0874.

In one or more embodiments, the MS of the soft magnets is determined based on equation $\lambda_m = V_s/(K \times \omega)$, where $\lambda_m$ is the flux linkage, $V_s$ is the measured voltage of the sense coils, ω is RPM and is constant in steady-state, and K is a constant related to the constructional values such as d-axis and q-axis resistances and inductances of the VFMM and the conversion ratio, which are fixed in a steady-state of the VFMM. Having constant K and ω at steady-state and $V_s$ induced in the sense coil, $\lambda_m$ can be determined. Then, the MS can be obtained from $\lambda_m$ by multiplying the $\lambda_m$ by a conversion ratio, which is a constant and depends on the design of the VFMM.

In one or more embodiments, the above equation can be expanded as follows.

$$V_q = (r_s \times I_q) + (\lambda_m \times \omega) + (\omega \times L_d \times I_d)$$

Where $V_q$ is the q-axis voltage induced on the sense coil, $L_d$ is the d-axis inductance, $I_d$ is d-axis current, $I_q$ is q-axis current, $r_s$ is the resistance of the sense coil in each of the phases and is constant. To measure $\lambda_m$, $I_d$ is considered to be zero and $I_q$ is equal to a phase current passing through a field-oriented controller controlling the VFMM. Therefore, by knowing $V_q$ measured by the sense coil and having $r_s$, $I_q$, and ω constant at steady-state, $\lambda_m$ can be determined.

According to one or more embodiments, a pulse of $I_d$ fed to the stator windings can change the VFMM magnetization, and consequently, can change the RPM of the VFMM. Because of the ability to change the MS of the soft magnets, the maximum RPM of the VFMM can be changed. Thus, the VFMM may be used without needing a transmission system to change the torque to speed ratio of the electric motor.

According to one or more embodiments, a controller controls the magnetization of the soft magnets. The controller may determine the MS of the soft magnets based on the bemf waveform (hereinafter, will be referred to as "bemf") measured by the sense coils. In one or more embodiments, the controller is capable of storing and compiling information and commanding VFMM drives (e.g., inventors, power supply, etc.) to alter the magnetization of the soft magnets according to the information. The controller may be a computer that includes a processor (e.g., a CPU) coupled to a memory (e.g., a RAM) to perform controlling of the MS.

Figure 8:
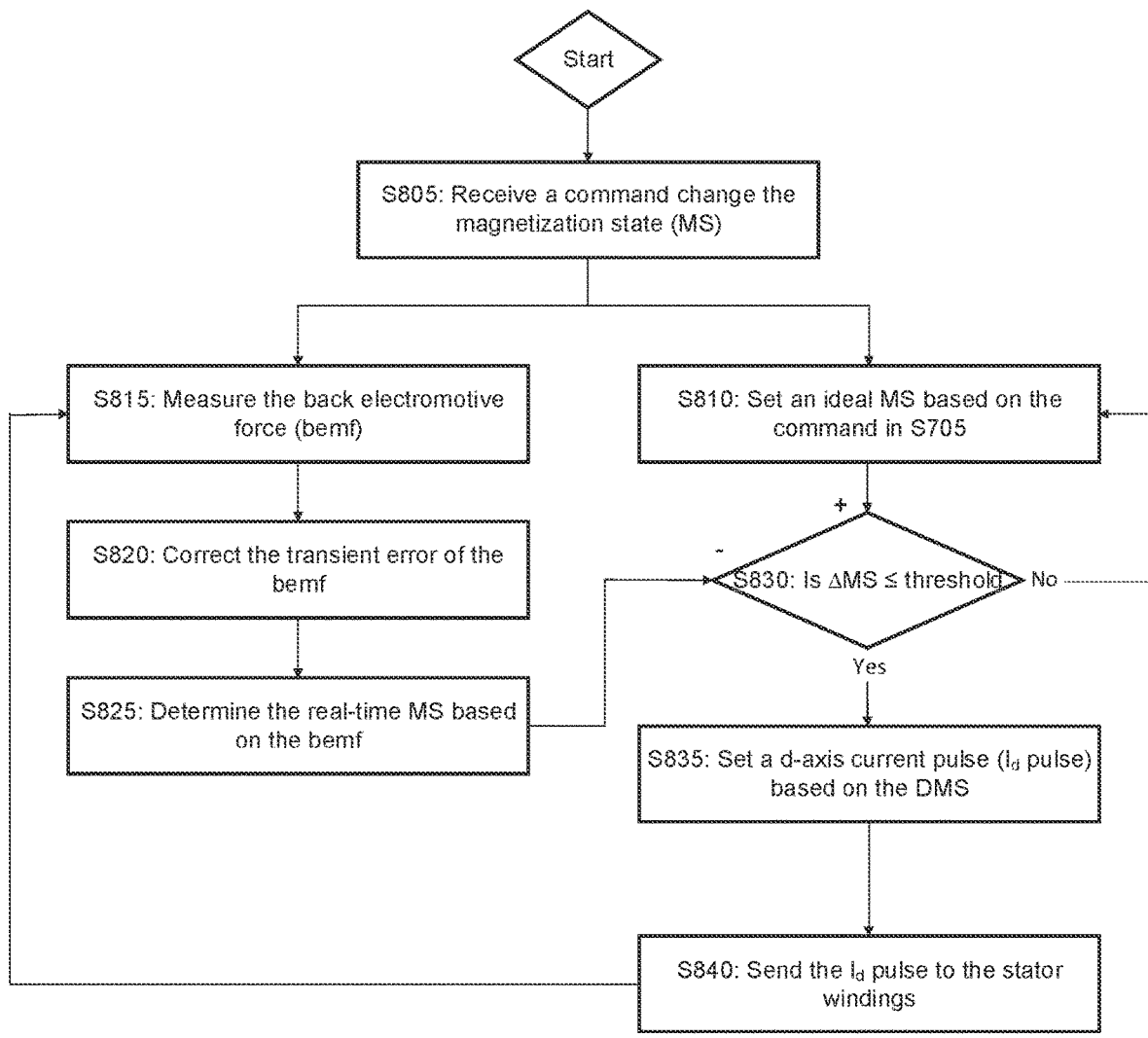
FIG. 8 shows a flowchart depicting a method for magnetization of a VFMM in accordance with one or more embodiments of the invention.

FIG. 8 shows a flowchart that depicts a method of manual controlling of the MS of the soft magnets and accordingly manually controlling the torque of the VFMM using the controller. Hereinafter, the manual control of the MS is a controlling procedure in which an initial command for changing the torque and accordingly the MS is initiated by a human. As a non-limiting example, in a case that the VFMM is a motor of an electric vehicle, the command may be a gear shift or a command to increase the speed of the electric vehicle from a driver. Alternatively, in a case that the VFMM is the motor of industrial machinery, the command may be made via an input on the control panel of the operator.

In step 805 (S805), the controller receives the command to change the MS. For example, the command may be an increase or decrease of the motor torque/RPM that requires changing the MS.

In S810, the controller determines and sets an ideal MS based on the command received in S805. For example, in a case the command is the gear shift, the ideal MS is determined based on a preliminary analysis (e.g., a table) that correlates the most optimal MS as the ideal MS to the chosen gear. For example, gear 1 may be associated with MS of 100%, while gear 2 may be associated to MS of 80%.

According to one or more embodiments, MS of 100% may be the MS of the soft magnets in which the soft magnets are magnetized to their full capacity or to a magnetization of the soft magnets that is defined (or limited to) as the maximum magnetization based on a specific design or function of the VFMM. On the other hand, MS of 0% is the MS of the soft magnets in which the soft magnets are completely demagnetized.

In another example in accordance with one or more embodiments, when the command to achieve a desired RPM/torque is received, the controller may find the ideal MS from a table that associates the desired RPM/torque to the ideal MS. Table 1 below shows an exemplary table that associates the desired RPM/torque to the ideal MS.

TABLE 1

| RPM | Torque (N.m.) | Ideal MS (%) |
|---|---|---|
| 1000 | 100 | 100 |
| 2000 | 200 | 100 |
| 4000 | 400 | 100 |
| 6000 | 250 | 75 (±5%) |
| 6000 | 150 | 75 (±5%) |
| 12000 | 100 | 50 (±5%) |
| 18000 | 50 | 22 (±5%) |

In S815, the controller measures the bemf of the VFMM. According to one or more embodiments, the bemf is the voltages generated in the sense coils by the rotor. The bemf is proportional to $\lambda_m$ by a constant factor. Thus, the bemf indicates the real-time MS (i.e., the actual MS of the soft magnets at the time of the measurement).

In S820, the controller may correct the value of the bemf measured in S815 from transient errors. For example, due to a transient operation of the VFMM or the power converter, the measured bemf may include transient errors/noises (e.g., sparks, oscillations, etc.) that do not project the real-time MS. The controller may remove the transient errors/noises from the bemf to obtain a more realistic value of the real-time MS.

In S825, the controller determines the real-time MS based on the bemf. For example, the controller may determine the real-time MS based on a table that associates various bemf values to values of the real-time MS. In one or more embodiments, the controller determines the real-time MS based on the corrected bemf from S820. Alternatively, the controller may use the uncorrected value of the bemf to determine the real-time MS.

In one or more embodiment, the controller may determine the real-time MS from the uncorrected or corrected bemf, and then, the controller may apply some corrections (e.g., filtering noise) on the value real-time MS to obtain the final value of the real-time MS.

According to one or more embodiments, after the command from S805, the real-time MS and the ideal MS may be determined simultaneously. To do this, S815 through S825 may be performed simultaneously with S810.

In S830, the controller subtracts the ideal MS obtained from S810 from the real-time MS obtained from S825 to obtain a magnetization difference (ΔMS). If the absolute value of ΔMS≤a threshold (e.g., 5% of the ideal MS), the real-time MS is sufficiently close to the ideal MS and there is no need to change the real-time MS. Otherwise, the controller continues to S835 described below.

In S835, the controller determines and sets an $I_d$ pulse based on the ΔMS obtained from S830. For example, the controller may determine the $I_d$ pulse based on a table that associates various values of the ΔMS to values of the $I_d$ pulse. In another example, the $I_d$ pulse may look similar to the pulses of electric current discussed above with reference to FIGS. 4A-4C and 5.

In S840, the controller commands sending the $I_d$ pulse determined from S835 to the stator windings of the VFMM.

For example, this command may be sent to the power convertor to generate and send the $I_d$ pulse to the stator windings.

According to one or more embodiments, the duration, shape, or number of the $I_d$ pulse may be determined based on the torque/RPM of the VFMM. According to one or more embodiments, the duration of the $I_d$ pulse may be about 1 millisecond (ms).

In one or more embodiments, after S840, the controller may go back to S815 and redo S815 and the steps after S815 to determine whether the ΔMS is within the threshold or not. If ΔMS is not within the threshold, the controller applies another $I_d$ pulse to adjust the real-time MS. This process may continue until the real-time MS is adjusted such that the ΔMS falls within the threshold.

Figure 9:
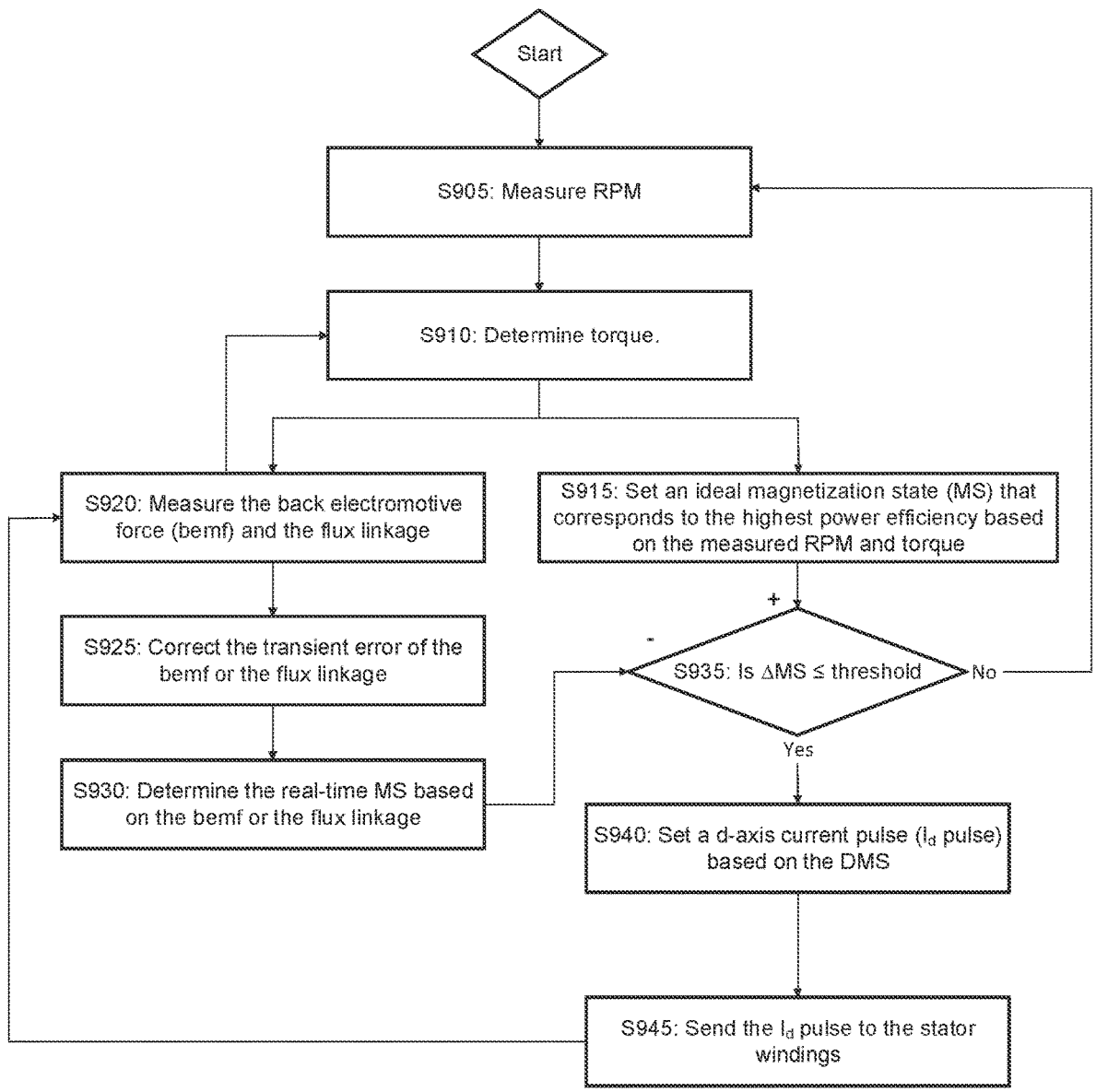
FIG. 9 shows a flowchart depicting a method for magnetization of a VFMM in accordance with one or more embodiments of the invention.

FIG. 9 shows a flowchart that depicts a method of automatic controlling of the MS of the soft magnets using the controller. Hereinafter, the automatic control of the MS is a controlling process that automatically adjusts the MS based on the RPM and torque of the VFMM to maintain the highest power efficiency of the VFMM.

In S905, the controller measures the RPM of the VFMM.

In S910, the controller determines the torque of the VFMM. According to one or more embodiments, the controller may determine the torque based on the bemf measured in S920 and/or S925, described below.

In S915, the controller determines and sets an ideal MS that corresponds to a criterion that is set for the VFMM. For example, the criterion may be the highest efficiency (e.g., power efficiency) based on the RPM and torque determined in S905 and S910, respectively, minimum magnetic signature, minimum coil temperature, etc. For example, the controller has access to a table that associates values of RPM and torque with values of the ideal MS, which results to the set criterion. From this table, the controller determines the ideal MS corresponding to the measured RPM and torque.

Figure 10:
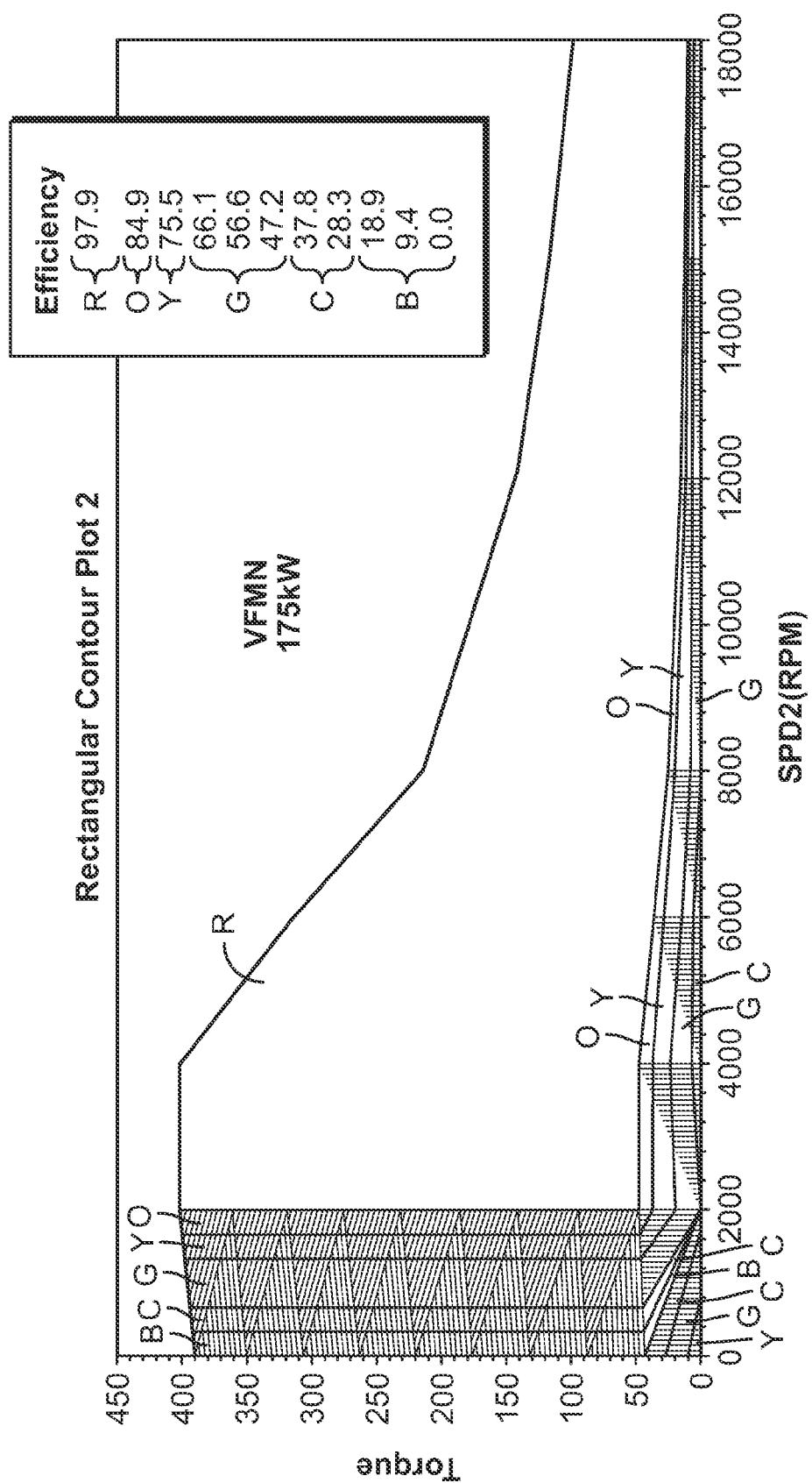
FIG. 10 shows a diagram in accordance with one or more embodiments of the invention.

FIG. 10 shows a thermal graph of the power efficiency of the VFMM with respect to the RPM and torque for the example where the set criterion is the power efficiency. In one or more embodiments, each point on the efficiency map of the VFMM shows the power efficiency and an ideal MS is associated with that point.

In S920, the controller measures the bemf of the VFMM. This is similar to S815 described above. According to one or more embodiments, the controller may also calculate the $\lambda_m$ of the VFMM based on the bemf. Then, the controller may determine the torque for S910 based on the $\lambda_m$.

For example, the torque may be calculated based on the following equation:

$$\text{Torque}=(3/2)\times(\text{number of poles}/2)\times\lambda_m$$

where $\lambda_m$ is determined based on the bemf.

In S925, the controller may correct the measured bemf in S815 from transient errors. This may be similar to S820 described above. According to one or more embodiments, the controller may calculate $\lambda_m$ based on the corrected bemf. Alternatively, the controller may calculate $\lambda_m$ based on the non-corrected bemf and then, correct $\lambda_m$ from the transient errors.

In S930, the controller determines the real-time MS based on the corrected bemf. This may be similar to S825 described above. According to one or more embodiments, the controller may determine the real-time MS based on the $\lambda_m$. For example, the controller may look up the real-time MS on a table that associates various $\lambda_m$ values to values of the real-time MS.

S935 is similar to S830. Further, according to one or more embodiments, if the absolute value of ΔMS≤a threshold, the real-time MS is ideal and there is no need to change the real-time MS. In this case the controller may go back to S905. Otherwise, the controller continues to S940.

S940 is similar to S835 described above.

S945 is similar to S840 described above.

In one or more embodiments, after S945, the controller may go back to S920 and redo S920 and steps after S920 to determine whether the ΔMS is within the threshold or not. If ΔMS is not within the threshold, the controller applies another $I_d$ pulse to adjust the real-time MS. This process may continue to adjust the real-time MS such that ΔMS falls within the threshold.

In one or more embodiments, the steps in each of the manual and automatic control of the MS described with reference to FIGS. 8-9 may be performed in a different order than what is described above, unless it is stated otherwise. The steps may be omitted or may be performed multiple times to achieve a desired control of the MS.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for magnetizing a soft magnet in a rotor of a variable-flux memory motor (VFMM), the method comprising:
measuring a back electromotive force generated by the soft magnet;
determining a real-time magnetization state of the soft magnet based on the measured back electromotive force;
determining a first pulse based on a difference between an ideal magnetization state and the real-time magnetization state of the soft magnet,
wherein the first pulse has a duration of equal to or more than 0.1 millisecond (ms) and equal to or less than 2 ms; and
applying the first pulse to a stator winding of the VFMM to set a magnetization state of the soft magnet to a first magnetization state when the first pulse ends.

2. The method of claim 1, wherein the duration of the first pulse is equal to or less than 1 ms.

3. The method of claim 1, wherein the duration of the first pulse is equal or greater than 0.3 ms.

4. The method of claim 1, wherein
the duration of the first pulse is less than 1 ms, and
one or more consecutive pulses with a duration of equal to or more than 0.3 ms and less than 1 ms magnetize the soft magnet.

5. The method of claim 1, wherein
the duration of the first pulse is equal to or more than 1 ms, and
only the first pulse magnetizes the soft magnet.

6. The method of claim 1, wherein the soft magnet is AlNiCo.

7. The method of claim 1, wherein the soft magnet is AlNiCo-9.

8. The method of claim 1, wherein a shape of the first pulse is triangular.

9. The method of claim 1, further comprising:
generating a second pulse of electric current that has a duration of equal to or more than 0.1 ms and equal to or less than 2 ms; and
applying the second pulse to the stator winding of the VFMM to set the magnetization state of the soft magnet to a second magnetization state when the second pulse ends,
wherein the second magnetization state is higher than the first magnetization state.

10. The method of claim 1, further comprising:
generating a plurality of consecutive pulses of electric current that each has a duration of equal to or more than 0.1 ms and equal to or less than 2 ms; and
applying the plurality of consecutive pulses to the stator winding of the VMM to set the magnetization state of the soft magnet to a target magnetization state when the plurality of consecutive pulses ends,
wherein the target magnetization state is higher than the first magnetization state.

11. A method of controlling the magnetization state of the soft magnet of the VFMM comprising the method according to claim 1, the method of controlling the magnetization state of the soft magnet of the VFMM further comprising:
receiving a command to change the magnetization state of the soft magnet;
determining the ideal magnetization state of the soft magnet based on the command; and
sending the first pulse to the stator winding of the VFMM to adjust the real-time magnetization state of the soft magnet to the first magnetization state such that an absolute value of the difference between the ideal magnetization state and the first magnetization state falls within a predetermined threshold.

12. A method of automatically controlling the magnetization state of the soft magnet of the VFMM comprising the method according to claim 1, the method of automatically controlling the magnetization state of the soft magnet of the VFMM further comprising:
measuring a speed of the VFMM;
determining a requested torque of the VFMM;
determining the ideal magnetization state of the soft magnet based on the speed and the requested torque of the VFMM;
and
sending the first pulse to the stator winding of the VFMM to adjust the real-time magnetization state to the first magnetization state such that an absolute value of the difference between the ideal magnetization state and the first magnetization state falls within a predetermined threshold.

13. A method of magnetizing a soft magnet of a variable-flux memory motor (VFMM), the method comprising:
measuring a speed of the VFMM;
determining a requested torque of the VFMM;
determining an ideal magnetization state of the soft magnet based on the speed and the requested torque of the VFMM;
measuring a back electromotive force generated by the soft magnet;
determining a real-time magnetization state of the soft magnet based on the measured back electromotive force;
determining a first pulse based on a difference between the ideal magnetization state and the real-time magnetization state of the soft magnet; and
sending the first pulse to a stator winding of the VFMM to adjust the real-time magnetization state to a first magnetization state such that an absolute value of the difference between the ideal magnetization state and the first magnetization state falls within a predetermined threshold,
wherein the VFMM is magnetized to a level using pulses of durations of less than 5 millisecond (ms).

14. The method of claim 13, wherein the soft magnet is AlNiCo.

15. The method of claim 13, wherein the soft magnet is AlNiCo-9.

16. The method of claim 13, wherein a shape of the first pulse is triangular.

* * * * *